United States Patent
Webster, Jr.

(10) Patent No.: US 9,955,207 B1
(45) Date of Patent: Apr. 24, 2018

(54) INTERFACE FOR INTERCHANGEABLE ENTERTAINMENT SYSTEMS

(71) Applicant: Charles Warren Webster, Jr., McKinney, TX (US)

(72) Inventor: Charles Warren Webster, Jr., McKinney, TX (US)

(*) Notice: Subject to any disclaimer, the term of this patent is extended or adjusted under 35 U.S.C. 154(b) by 0 days.

(21) Appl. No.: 15/354,929

(22) Filed: Nov. 17, 2016

(51) Int. Cl.
*H04N 21/414* (2011.01)
*H04N 21/439* (2011.01)
*H04N 21/44* (2011.01)
*H04N 21/422* (2011.01)
*H04N 21/436* (2011.01)
*H04R 3/12* (2006.01)

(52) U.S. Cl.
CPC . *H04N 21/41422* (2013.01); *H04N 21/42203* (2013.01); *H04N 21/42222* (2013.01); *H04N 21/436* (2013.01); *H04N 21/439* (2013.01); *H04N 21/44* (2013.01); *H04R 3/12* (2013.01); *H04R 2499/13* (2013.01)

(58) Field of Classification Search
None
See application file for complete search history.

(56) References Cited

U.S. PATENT DOCUMENTS

| | | | | |
|---|---|---|---|---|
| 5,617,331 A | * | 4/1997 | Wakai | H04H 20/62 348/E7.049 |
| 2003/0084451 A1 | * | 5/2003 | Pierzga | H04N 5/44543 725/47 |
| 2006/0107295 A1 | * | 5/2006 | Margis | H04N 7/163 725/81 |
| 2009/0081947 A1 | * | 3/2009 | Margis | H04B 7/18508 455/3.02 |

\* cited by examiner

*Primary Examiner* — Michael R Telan
(74) *Attorney, Agent, or Firm* — Plager Schack LLP; Mark H. Plager

(57) ABSTRACT

An interface system is configured to toggle audio and visual signals on a touring bus. The interface system includes a plurality of video displays, electrically coupled to a microcontroller with a video distribution amplifier. Passenger speakers and a passenger audio amplifier are electrically coupled to the microcontroller. Two media players are electrically coupled to the microcontroller. Three microphones and auxiliary audio/video inputs are electrically coupled to the microcontroller. The microcontroller is programmed with instructions to detect a digital video disc in the first media player. Then, transmit a first video signal from the first media player to the plurality of video displays. Next, transmit a first audio signal from the first media player to the plurality of passenger speakers. After that, transmit a second audio signal from the second media player to the plurality of driver speakers.

2 Claims, 6 Drawing Sheets

INTERFACE FOR INTERCHANGEABLE ENTERTAINMENT SYSTEMS

BACKGROUND

The embodiments herein relate generally to an interface for interchangeable entertainment systems that are installed on a touring bus.

Prior to embodiments of the disclosed invention, there was no back up for the single entertainment system presently provided to the passenger area of a touring motor coach. Embodiments of the disclosed invention solve this problem.

SUMMARY

An interface system is configured to toggle video signals and audio signals at both line level and speaker level on a touring bus between the driver and passenger areas. The interface system includes a plurality of video displays electrically coupled to a microcontroller via a video distribution amplifier. A plurality of passenger speakers is electrically coupled to the microcontroller as well as a passenger audio amplifier. A plurality of driver's speakers is electrically coupled to the microcontroller. A first media player is electrically coupled to the microcontroller. A second media player is electrically coupled to the microcontroller. Three microphones and auxiliary audio/video inputs are electrically coupled to the microcontroller.

The insertion of a video disc into the first media player creates a video trigger from it which causes the microcontroller program to send that media player's video signals to the passenger area video distribution amplifier and monitors as well as its audio line level signals to the passenger audio amplifier and plurality of speakers. It also sends the three microphone inputs and three auxiliary audio/video inputs to that media player. Simultaneously, the microcontroller sends only the speaker level audio from the second media player to the plurality of the driver's speakers.

The microcontroller is further programmed to detect a digital video disc upon insertion into the second media player via a video trigger from it. When this happens, the microcontroller will disconnect the first media player's video output signal from the passenger video distribution amp and monitors and the audio line level outputs from the passenger audio amp and plurality of speakers. The three microphone and auxiliary audio/video inputs to it will also be disconnected.

It will then attach all of the second media player's video and audio output signals to the video distribution amp and monitors and its' audio signals to the passenger amplifier and plurality of speakers. The three microphones and auxiliary audio/video inputs formerly attached to the first media player will also now be attached to the second media player. Simultaneously, the first media player will be attached only to the plurality of driver's speakers.

Insertion of a video disc into the first media player reverses the delegation of both media players' inputs and outputs back to where they were at first.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
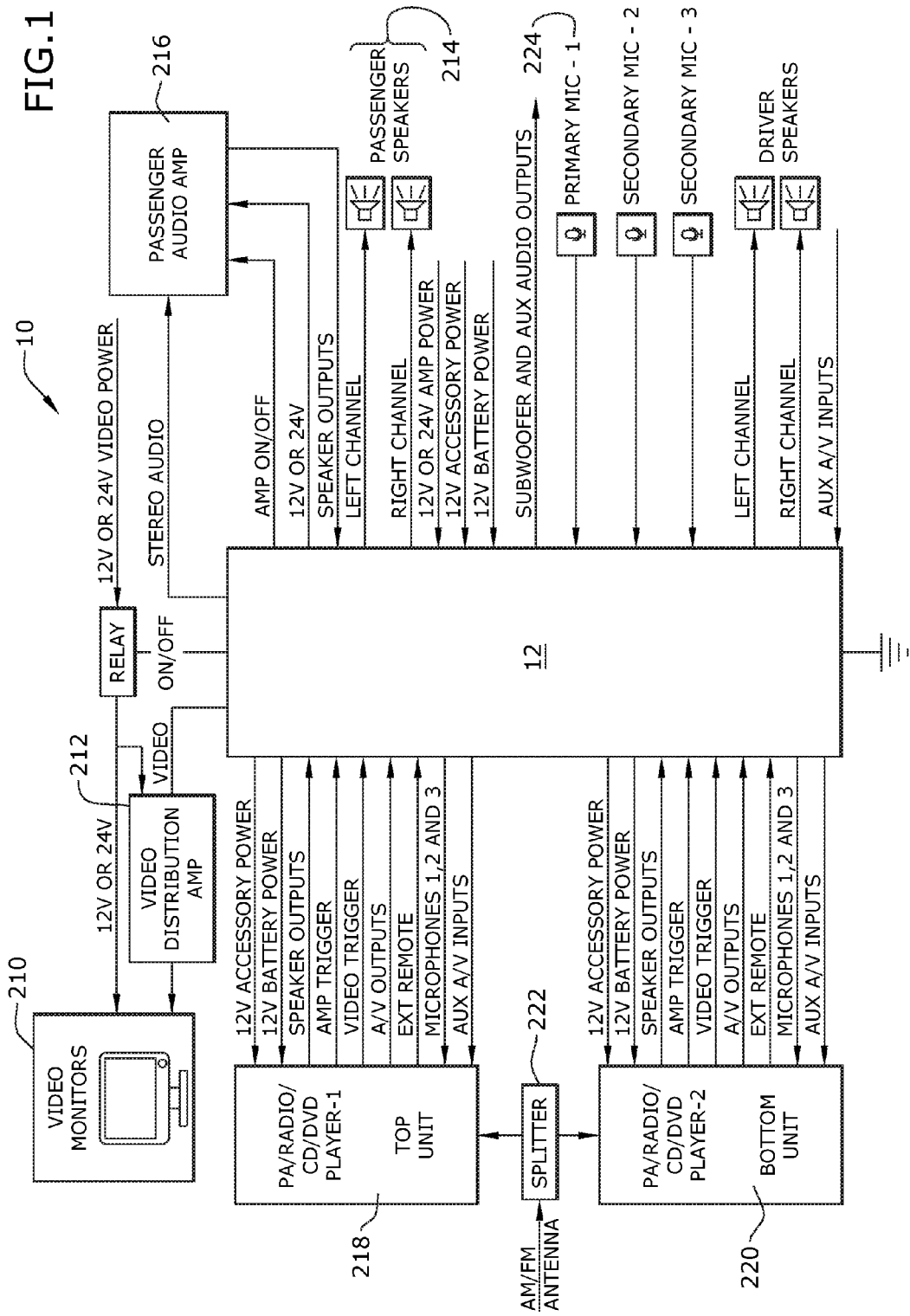
FIG. 1 shows a schematic view of one embodiment of the present invention.
Figure 2:
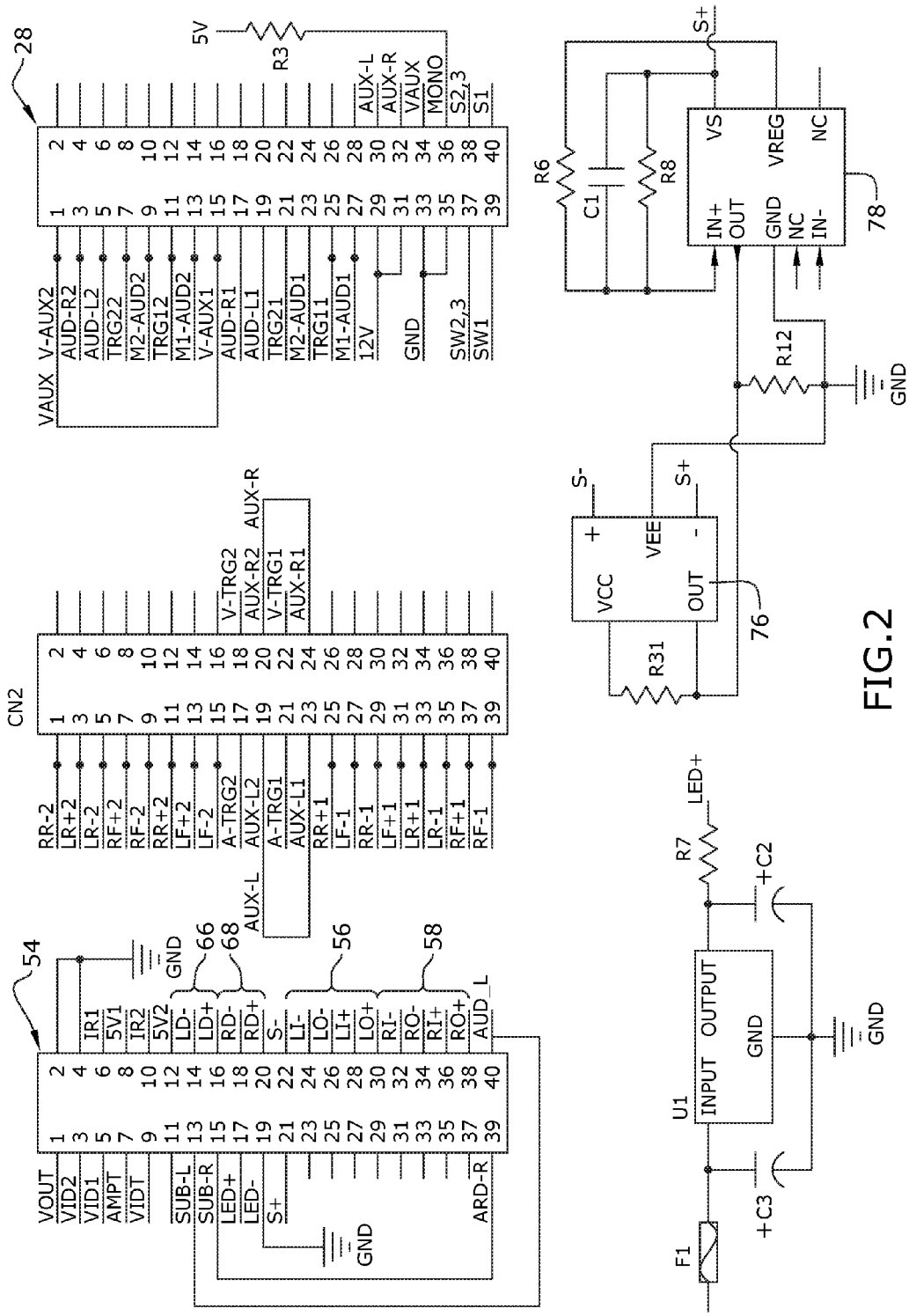
FIG. 2 shows a schematic view of one embodiment of the present invention.
Figure 3:
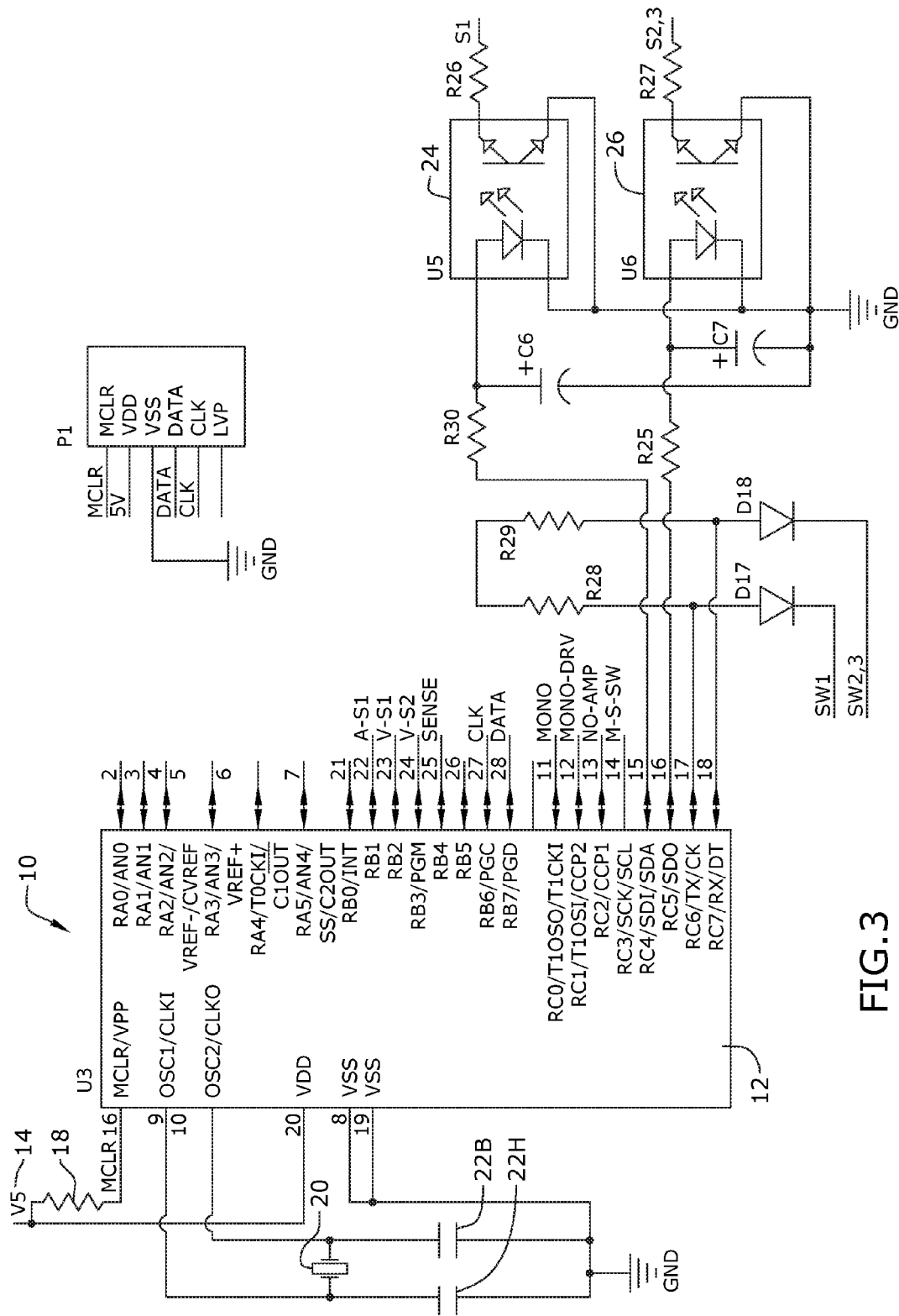
FIG. 3 shows a schematic view of one embodiment of the present invention.
Figure 4:
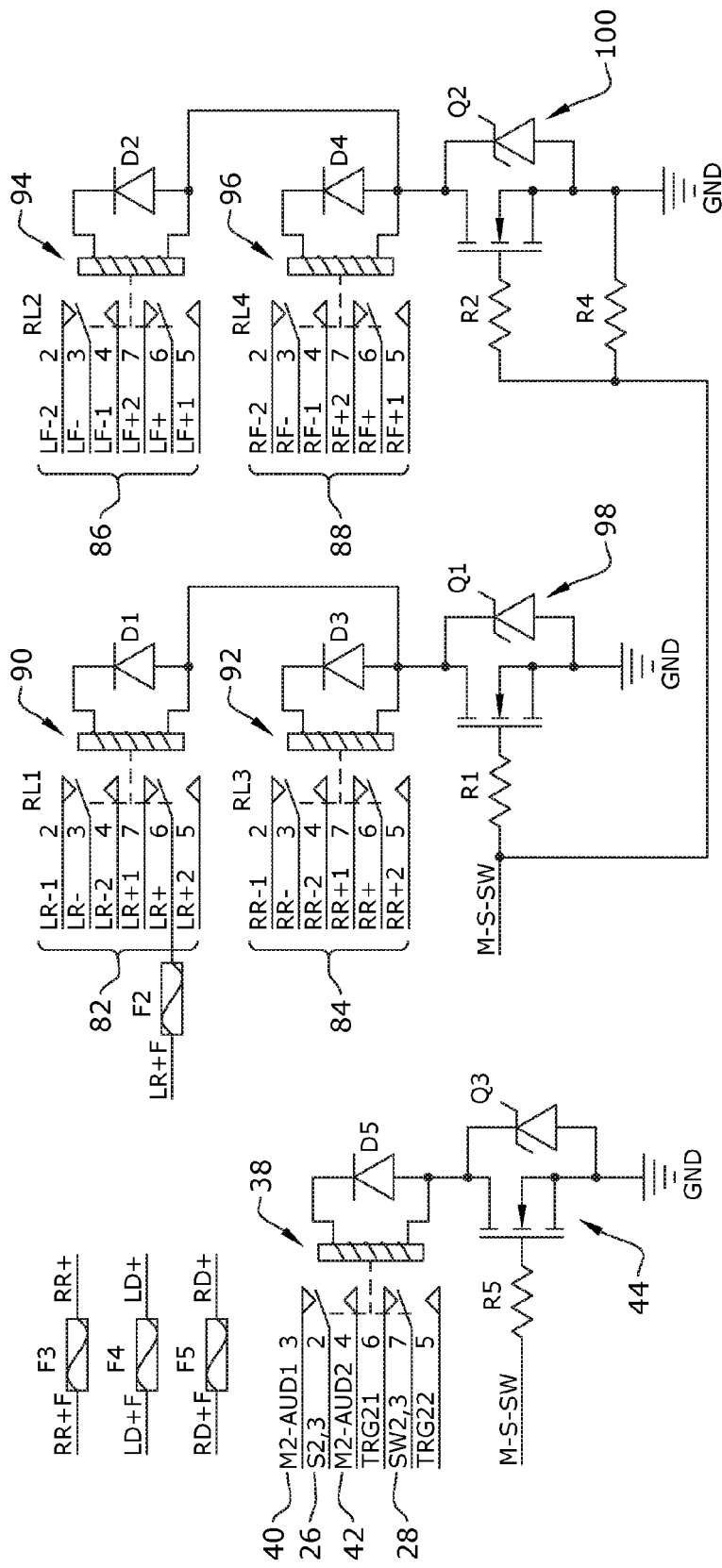
FIG. 4 shows a schematic view of one embodiment of the present invention.
Figure 5:
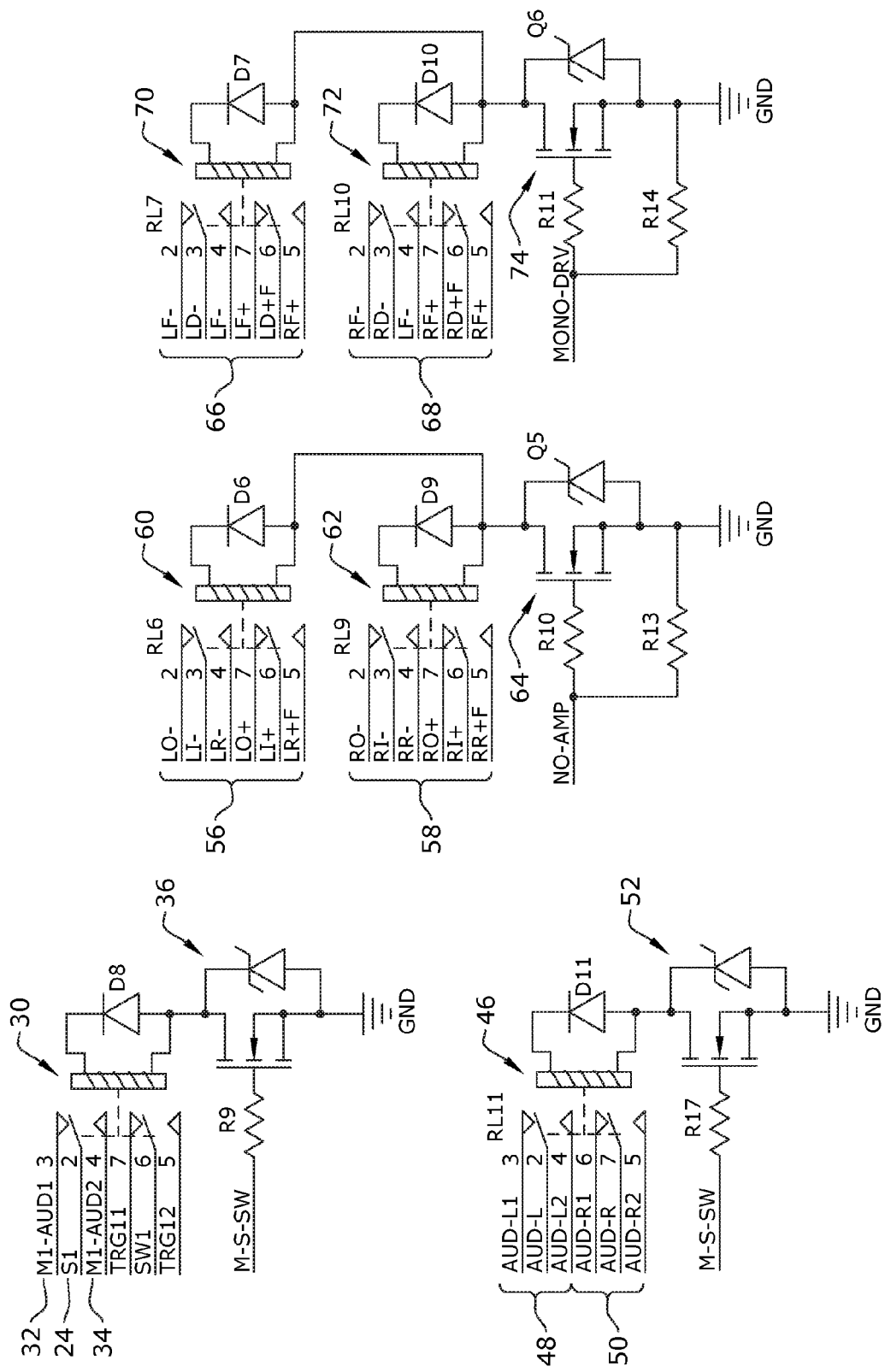
FIG. 5 shows a schematic view of one embodiment of the present invention.
Figure 6:
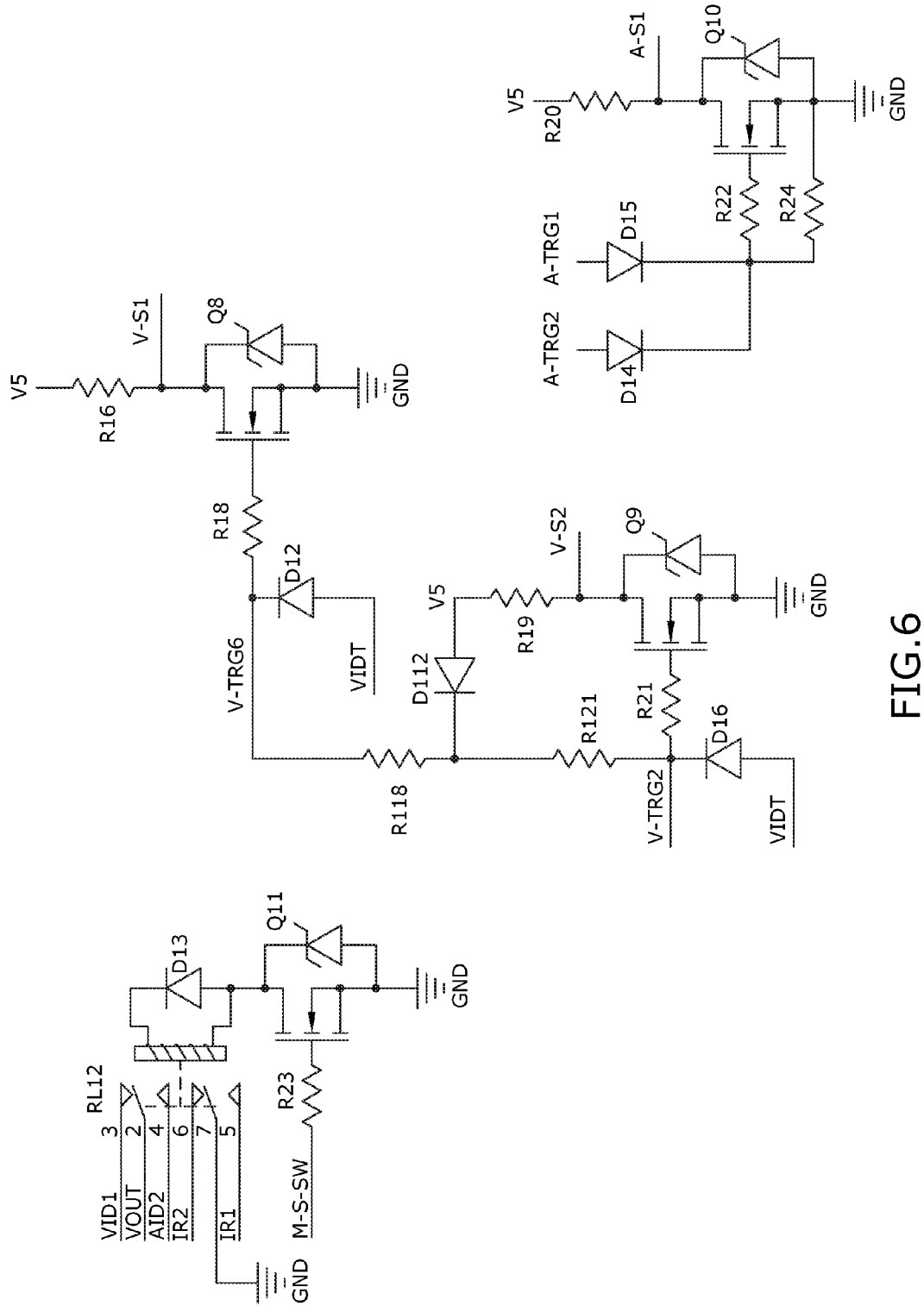
FIG. 6 shows a schematic view of one embodiment of the present invention.

Turning first to FIG. 1, an interface system 10 is configured to toggle audio and visual signals on a touring bus. The interface system includes a plurality of video displays 210 electrically coupled to a microcontroller 12 through a video distribution amplifier 212. A plurality of passenger speakers 214 is electrically coupled to the microcontroller. A passenger audio amplifier 216 is electrically coupled to the microcontroller. A first media player 218 is electrically coupled to the microcontroller. A second media player 220 is electrically coupled to the microcontroller. The two media players are electrically coupled together via an AM/FM antenna splitter 222. Microphones 224, 226 and 228 as well as audio/video inputs 230 are also electrically connected to the microcontroller 12.

The microcontroller is programmed with instructions to detect a digital video disc in the first media player. Then, transmit a first video signal from the first media player to the plurality of video displays. Next, transmit a first audio signal from the first media player to the plurality of passenger speakers. After that, transmit a second audio signal from the second media player to the plurality of driver speakers.

The microcontroller is further programmed to detect a digital video disc in the second media player. Then, stop the first video signal, the first audio signal and the second audio signal. Next, transmit the second video signal from the second media player to the plurality of video displays. After that, transmit the second audio signal to the plurality of passenger speakers. Following that, transmit the first audio signal to the plurality of driver speakers.

By way of example, and referring to FIGS. 2-6, an interface system 10 further comprises a microcontroller 12. The microcontroller 12 is shown to be a MICROCHIP® PIC16F876A the entire operation of this particular piece of hardware is explained in a datasheet available at ww1.microchip.com that is hereby incorporated by reference. Microcontroller 12 is attached to a first voltage source 14 at a master clear pin 16 with a first resistor 18. The microcontroller 12 is further attached to an oscillator 20 with a pair of capacitors 22A, 22B. The microcontroller 12 is further attached to a first opto-isolator 24 and a second opto-isolator 26.

The first opto-isolator 24 and the second opto-isolator 26 are electrically coupled to a first header pin box 28. A first relay 30 is attached to a first audio first channel input 32, the first opto-isolator 24, a first audio second channel input 34, the first header pin box 28 and some trigger switches. The first relay 30 is further connected to the microcontroller 12 with a first MOSFET 36. A second relay 38 is attached to a second audio first channel input 40, the second opto-isolator 26, a second audio second channel input 42, the first header pin box 28 and some trigger switches. The second relay 38 is further connected to the microcontroller 12 with a second MOSFET 44.

Natively in touring buses, there are two audio channels—left and right. The left channel and the right channel are slightly different moving from front to back to create a stereo affect. The design challenge here is that when any microphone is engaged there will be feedback or an echo unless the audio channels are turned off at the same moment any microphone is turned on. A third relay 46 accomplishes this. The third relay 46 is attached to a plurality of left channel outputs 48 and a plurality of right channel outputs 50. The plurality of left channel outputs 48 and the plurality of right channel outputs 50 are attached to the first header pin box 28. The third relay 46 is further connected to the microcontroller 12 with a third MOSFET 52.

In addition to turning sound off the interface system 10 needs to be able to turn sound on to the speakers. This is done through a second header pin box 54. Second header pin box 54 is attached to a plurality of left speaker outputs 56 and plurality of right speaker outputs 58. The plurality of left speaker outputs 56 is attached to a fourth relay 60. The plurality of right speaker outputs 58 is attached to a sixth relay 62. The fourth relay and the fifth relay are attached in series to a fourth MOSFET 64. The fourth MOSFET 64 is attached to the microcontroller 12.

Second header pin box 54 is attached to a second plurality of left speaker outputs 66 and plurality of right speaker outputs 68. The plurality of left speaker outputs 66 is attached to a sixth relay 70. The second plurality of right speaker outputs 68 are attached to a seventh relay 72. The sixth relay and the seventh relay are attached in series to a fifth MOSFET 74. The fifth MOSFET 74 is attached to the microcontroller 12.

All electronic systems in some regard condition power, but MOSFETs can be uniquely sensitive to power spikes over time. Second header pin box 54 is attached to single voltage comparator 76. Single voltage comparator is attached to the negative and positive power terminals for the second header pin box 54. Single voltage comparator 76 is connected to fast response, high voltage current shunt comparator 78. Single voltage comparator 76 and fast response, high voltage current shunt comparator 78 operate to ensure that second header pin box 54 is operating on five volts.

In addition to audio outputs, there are audio inputs. Third header box 80 is connected to a plurality of left rear audio inputs 82 with a fuse, a plurality of right rear audio inputs 84 with a fuse, a plurality of left front audio inputs 86 with a fuse and a plurality of left rear audio inputs 88 with a fuse. The plurality of left rear audio inputs 82 are connected to a seventh relay 90 which is connected in series to an eighth relay 92 that is attached to the plurality of right rear audio inputs 84. In the event of a power surge, the fuse blows and audio inputs are then rerouted through the second header box 56.

The plurality of right rear audio inputs 86 are connected to a ninth relay 94 which is connected in series to a tenth relay 96 that is attached to the plurality of right rear audio inputs 88. The eighth relay 92 is connected to the microprocessor 12 with a sixth MOSFET 98. The tenth relay 96 is connected to the microprocessor 12 with a seventh MOSFET 100.

On of a plurality of video inputs 102 can be toggled with an eleventh relay 104 that is attached to the microprocessor with an eighth MOSFET 106.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. An interface system, configured to toggle audio and visual signals on a touring bus; the interface system comprising:
    a plurality of video displays, electrically coupled to a microcontroller with a video distribution amplifier;
    a plurality of passenger speakers, electrically coupled to the microcontroller; a plurality of driver speakers, electrically coupled to the microcontroller; a passenger audio amplifier, electrically coupled to the microcontroller; a first media player electrically coupled to the microcontroller;
    a second media player, electrically coupled to the microcontroller and to the first media player via an AM/FM antenna splitter;
    three microphones, electrically coupled to the microcontroller and auxiliary audio/video inputs electrically connected to the microcontroller;
    wherein the microcontroller is programmed with instructions to:
        detect a digital video disc in the first media player which engages a video trigger;
        upon receiving the video trigger, transmit a first video signal from the first media player to the plurality of video displays through a video distribution amplifier;
        upon transmitting the first video signal, transmit a first audio signal from the first media player to the plurality of passenger speakers through a passenger audio amplifier; and upon transmitting the first audio signal, transmit a second audio signal from the second media player to the plurality of driver speakers;

upon transmitting a second audio signal, detect a digital video disc in the second media player with a second video trigger;

upon receiving the second video trigger, disconnect the first video signal, the first audio signal and the second audio signal;

upon disconnecting the first video signal, transmit the second video signal from the second media player to the plurality of video displays through the video distribution amplifier;

upon transmitting the second video signal, transmit the second audio signal to the plurality of passenger speakers through the passenger audio amplifier; and upon transmitting the second audio signal to the plurality of passenger speakers, transmit the first audio signal to the plurality of driver speakers.

2. The interface system of claim 1, wherein the plurality of passenger speakers further comprises:

a first set of speaker outputs and a second set of speaker outputs;

a first header pin box, electrically coupled to a first opto-isolator and the second opto-isolator which are further electrically coupled to the microcontroller;

a second header pin box, attached to the first set of speaker outputs and the second set of speaker outputs;

a single voltage comparator attached to the second header pin box;

negative and positive power terminals for the second header pin box, attached to the single voltage comparator;

a fast response, high voltage current shunt comparator, attached to the single voltage comparator;

wherein the single voltage comparator and fast response, high voltage current shunt comparator operate to ensure that the second header pin box is operating on five volts.

* * * * *